United States Patent
Peetz

(10) Patent No.: US 9,157,993 B2
(45) Date of Patent: Oct. 13, 2015

(54) DETECTING AN UNDERGROUND OBJECT

(75) Inventor: Bruce Peetz, Los Gatos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 555 days.

(21) Appl. No.: 13/483,390

(22) Filed: May 30, 2012

(65) Prior Publication Data

US 2013/0321191 A1 Dec. 5, 2013

(51) Int. Cl.
*G01S 13/04* (2006.01)
*G01S 13/06* (2006.01)
*G01S 13/88* (2006.01)
*G01V 3/12* (2006.01)

(52) U.S. Cl.
CPC ............... *G01S 13/06* (2013.01); *G01S 13/885* (2013.01); *G01V 3/12* (2013.01)

(58) Field of Classification Search
CPC .......... G01S 13/885; G01S 13/89; G01V 3/12
USPC ........................................................... 342/22
See application file for complete search history.

(56) References Cited

U.S. PATENT DOCUMENTS

| | | | |
|---|---|---|---|
| 6,091,354 A | 7/2000 | Beckner et al. | |
| 6,094,157 A * | 7/2000 | Cowdrick | 342/22 |
| 6,624,781 B1 * | 9/2003 | Collins | 342/22 |
| 7,170,440 B1 | 1/2007 | Beckner | |
| 7,190,168 B2 * | 3/2007 | Fujiwara | 324/337 |
| 7,391,362 B2 | 6/2008 | Beckner | |
| 8,766,845 B2 | 7/2014 | Hallquist et al. | |
| 8,797,208 B2 * | 8/2014 | Stirling-Gallacher et al. | 342/179 |
| 2010/0052971 A1 * | 3/2010 | Amarillas | 342/22 |
| 2013/0120181 A1 * | 5/2013 | Hallquist et al. | 342/22 |

* cited by examiner

*Primary Examiner* — John B Sotomayor
*Assistant Examiner* — Marcus Windrich

(57) ABSTRACT

In a method of detecting an underground object which is at least partially under a surface of ground, a first view of the object determined by transmitting a first radar signal from a first known geolocation. A second view of the object is determined by transmitting a second radar signal from a second known geolocation. The respective first and second trajectories of the first and second radar signals are oblique with respect to the surface of the ground and the respective first and second trajectories are at a first angle with respect to each other. A position of the object is estimated by maximizing a correlation between the first view and the second view by adjusting an estimated dielectric constant associated with medium between the object and the surface of the ground.

28 Claims, 9 Drawing Sheets

DETECTING AN UNDERGROUND OBJECT

BACKGROUND

Excavation is often done to expose an underground object, such as a pipe, for maintenance or replacement. Digging as close to the object being sought with automated digging machines, such as back hoes, maximizes the efficiency of excavation. However, if the location of the object is not determined accurately enough, damage may occur. Furthermore, there may be other objects to be avoided in the excavation process, even if the excavation isn't exposing existing infrastructure. If the objects underground are not known or adequately located, the excavation team may have to limit the use of automated digging equipment to avoid damaging the objects, and spend a significant amount of time manually digging with shovels.

One solution to this problem has been to use injected radiation. In this process, an RF signal is injected into the object at a place where it breaks the surface, and the rest of the object, typically a pipe is tracked by a device on the surface that is sensitive of the radiated signal. However, injected radiation requires a portion of the object to be exposed above the ground's surface so can be energized, and also requires the object to be conductive.

Another solution to this problem involves Ground Penetrating Radar (GPR) in which the radar signals are transmitted into the ground at a perpendicular angle. GPR is sensitive to a broader range of objects as it relies only on differences in dielectric constant between the object and the surrounding ground to generate returns, which is not limited to conductive objects. However, this technique has not always provided adequate resolution or accurate depth measurements of the objects in the ground.

An alternative GPR method utilizes an array of antenna positions from a single point of view in order to form a synthetic aperture, typically from an oblique angle. The oblique angle is used primarily to enable the array of antenna positions to be made uniform by employing an antenna structure, which would be cumbersome if done at while wheeled or towed along the ground as occurs with the standard form of GPR. Synthetic aperture improves accuracy and resolution somewhat from standard GPR, but not to the degree needed in excavation work.

BRIEF DESCRIPTION OF THE DRAWINGS

The accompanying drawings, which are incorporated in and form a part of this application, illustrate embodiments of the subject matter, and together with the description of embodiments, serve to explain the principles of the embodiments of the subject matter. Unless noted, the drawings referred to in this brief description of drawings should be understood as not being drawn to scale.

DESCRIPTION OF EMBODIMENTS

Figure 1:
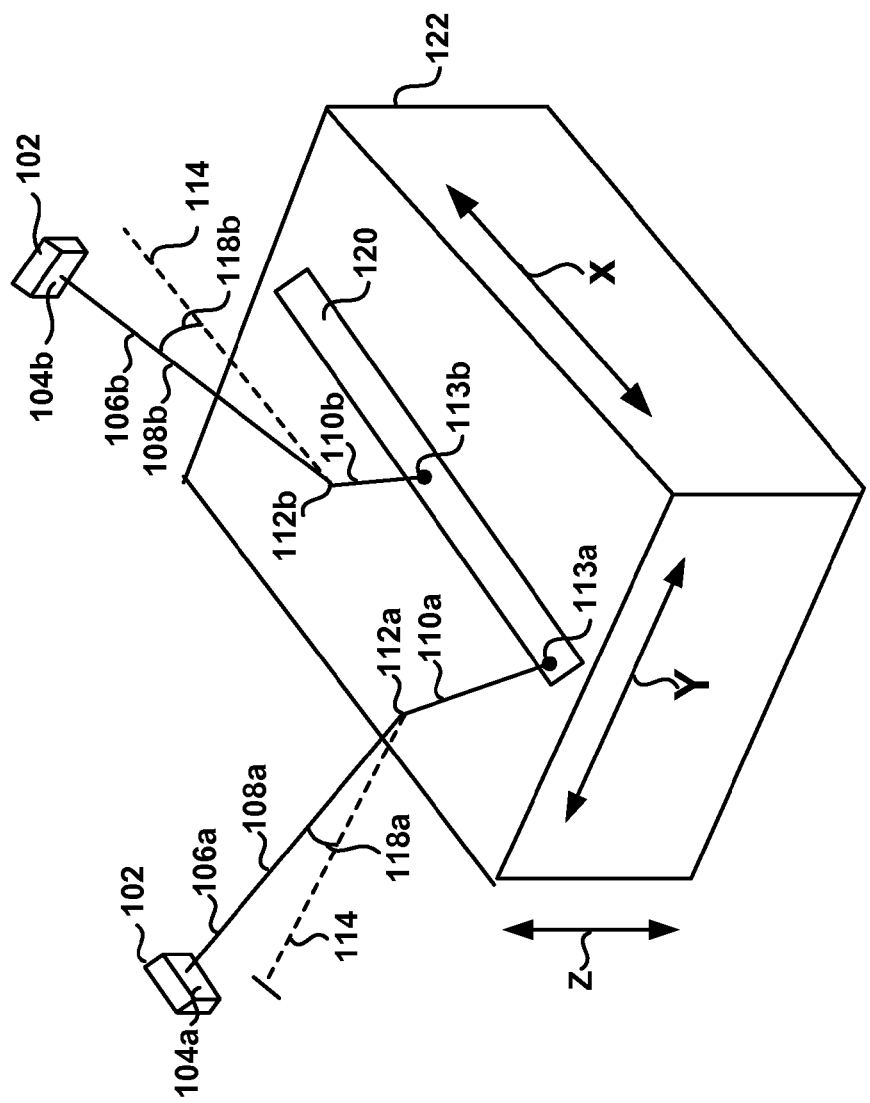
FIG. 1 depicts a perspective view of a technique for taking two views of an underground object, according to one embodiment.

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope as defined by the appended claims. In some embodiments, all or portions of the electronic computing devices, units, and components described herein are implemented in hardware, a combination of hardware and firmware, a combination of hardware and computer-executable instructions, or the like. Furthermore, in the following description, numerous specific details are set forth in order to provide a thorough understanding of the subject matter. However, some embodiments may be practiced without these specific details. In other instances, well-known methods, procedures, objects, and circuits have not been described in detail as not to unnecessarily obscure aspects of the subject matter.

Notation and Nomenclature

Unless specifically stated otherwise as apparent from the following discussions, it is appreciated that throughout the present Description of Embodiments, discussions utilizing terms such as "determining," "approximating," "estimating," "correlating," or the like, often (but not always) refer to the actions and processes of a computer system or similar electronic computing device. The electronic computing device manipulates and transforms data represented as physical (electronic) quantities within the electronic computing device's processors, registers, and/or memories into other data similarly represented as physical quantities within the electronic computing device's memories, registers and/or other such information storage, processing, transmission, or/or display components of the electronic computing device or other electronic computing device(s).

Overview of Discussion

According to various embodiments, a method and system are provided for detecting an object that is under the surface of the ground. One of the problems with underground radar detection is that the cross section of the underground object may be too small compared with the wavelength of the radar signal to provide adequate resolution. Some radars use a wide array of frequencies to improve detection, however the shorter wavelengths capable of detecting smaller objects do not penetrate into the ground well. Detecting and resolving long narrow items, such as pipes, can be compromised if the view from radar happens to be end-on to the pipe.

Another limitation in underground radar location is accuracy. Even if the position of the radar unit is precisely known, locating the underground object depends on the time-of-flight or phase shift of the radar signal. This signal velocity measurement is a function of the dielectric constant of the ground.

Since the dielectric constant of the ground is not well known through the volume, the accuracy of the object's position is only as good as the estimate of the dielectric constant.

According to various embodiments, improved accuracy or improved resolution, or a combination thereof, with respect to legacy techniques of detecting an object is provided. Improved accuracy here refers to better determination of the three dimensional location of the object with respect to a known frame of reference. The location of the object includes how far the object is under the ground's surface (also referred to herein as "depth"), among other things. Improved resolution pertains to the ability to know that an underground object is present. Improved accuracy, improved resolution, or improved accuracy and resolution shall be referred to herein as "improved detection."

Improved detection can be provided by taking at least two views of the object from different geolocations, according to various embodiments. For example, improved resolution and improved accuracy can be provided by taking two views of an object where the trajectories of the radar signals for the respective views form an angle that is approximately 90 degrees. Accuracy can be improved further by taking a third or fourth view of the object that form respective angles of approximately 180 degrees and 270 degrees with respect to the first radar signal.

Viewing the object at 90 degrees, or some other angle not close to the original view or 180 degrees, ensures that a long narrow object, such as a pipe, will have at least one long cross section in view of the radar and thus be detected.

Information pertaining to the views, particularly views that are 180 degrees from one another can be used to better estimate a dielectric constant of the medium between the surface of the ground and the underground object. If the ground is made of more than one type of material, the information pertaining to the views can be used as an aid in estimating dielectric constants for each of the materials.

The one or more dielectric constants can be used as a part of estimating the velocity at which a radar signal traveled through the ground. The velocity estimate can be used as a part of estimating the location of the object in the ground. The improved estimation of dielectric constant directly improves that accuracy of the underground object location.

Multiple Views of an Object

FIG. 1 depicts a perspective view of a technique for taking two views of an underground object, according to one embodiment.

FIG. 1 depicts a volume 122 that is below the surface 114 of the ground. This volume 122 is referred to as a "subsurface volume 122." The subsurface volume 122 is defined by an x-axis, a y-axis and a z-axis. As depicted in FIG. 1, the length of the subsurface volume 122 is defined by the x-axis, the width of the subsurface volume 122 is defined by the y-axis, and the depth of the subsurface volume 122 is defined by the z-axis.

An object 120 is located in the subsurface volume 122. It may be known that the object 120 is somewhere within the subsurface volume 122. However, it may not be known that the object 120 is somewhere within the subsurface volume 122. Further, it may be known that a first object 120 is within the subsurface volume 122 and while the first object 120 is being processed, according to various embodiments, a second object that was not previously known may be discovered.

Two views of the object 120 can be taken from the respective first and second geolocations 104a, 104b. More specifically, a first view of the object 120 can be obtained using a radar head 102 positioned at the first geolocation 104a and a second view of the object 120 can be obtained using the radar head 102 positioned at the second geolocation 104b. By "geolocation," what is meant is a location known in three dimensions with respect to a common frame of reference to other objects. Thus, as utilized herein, geolocation 104 is a location known in three dimensions, which may be expressed with three-dimensional coordinates (e.g., x, y, and z coordinates).

Figure 2:
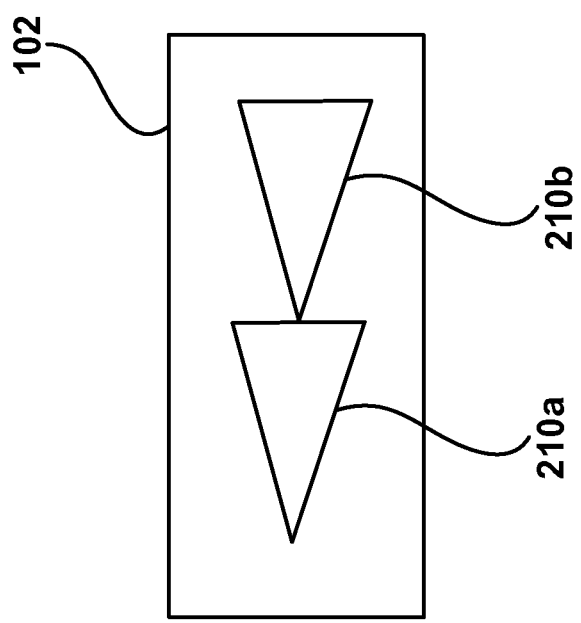
FIG. 2 depicts a radar head, according to one embodiment.

Referring to FIG. 2, the radar head 102 can include a transmitting radar antennae 210a and a receiving radar antennae 210b, according to one embodiment. The radar head 102 may or may not be a part of a Synthetic Aperture Radar (SAR) device, as discussed herein.

Returning to FIG. 1, a first radar signal 106a can be transmitted from the transmitting radar antennae 210b located at the first geolocation 104a. The first radar signal 106a can travel through the air along a trajectory as indicated by the air path 108a. The first radar signal 106a can enter the ground at location 112a where it intercepts the surface 114 of the ground. According to one embodiment, information describing the contour of the ground's surface 114 is used as a part of estimating where the radar signal 106a intercepted 112a the surface 114 of the ground. The angle 118a of the transmitted radar signal 106a with respect to the ground's surface 114 and information pertaining to the contour of the ground's surface 114 can be used to estimate where the radar signal 106a intercepted 112a the ground's surface 114.

The first radar signal 106a can travel along the earth path 110a and intercept the object 120 at location 113a, which causes the first radar signal 106a to be reflected back. The receiving radar antennae 210b can receive the reflected radar signal 106a for the first view at the first geolocation 104a.

According to one embodiment, "information describing a view" includes, but is not limited to, the angle 118a between the transmitted radar signal 106a and the ground's surface 114, the length of the air path 108a for that radar signal 106a, and the time between the time of transmission of the radar signal 106a and the time the reflected radar signal 106a returned.

The radar head 102 can be moved to the second geolocation 104b where similar processing can be performed to obtain a second view. More specifically, a second radar signal 106b can be transmitted from the transmitting radar antennae 210a located at the second geolocation 104b. The second radar signal 106b can travel through the air along a trajectory as indicated by the second air path 108b. According to one embodiment, the trajectory of the air path 108a for the first radar signal 106a and the trajectory of the air path 108b for the second radar signal 106b form an angle that is approximately 90 degrees. The second radar signal 106b can enter the ground's surface 114 at location 112b where it intercepts the surface 114 of the ground.

The second radar signal 106b can then travel along the earth path 110b and intercept the object 120 at location 113b, which causes the second radar signal 106b to be reflected back. The receiving radar antennae 210b can receive the reflected radar signal 106b for the second view at the second geolocation 104b.

In order to maximize the power of the radar signals 106 that enter the ground, according to one embodiment, trajectories of the radar signals 106a, 106b for the respective geolocations 104a, 104b form approximate Brewster angles 118a, 118b with respect to the ground's surface 114.

The subsurface volume 122 may be made of a homogenous medium or may be made of a heterogeneous medium. An example of a homogenous medium is a medium made of one type of material. An example of a heterogeneous medium is a medium made of different types of materials. More specifically, the subsurface volume 122 may be made of layers of different types of material where examples of the layers are asphalt, gravel, a mixture of gravel and dirt, dirt, clay, among other things. A layer may be made of a mixture of materials. Each of the types of materials or layers of materials has a dielectric constant. According to one embodiment, approximations of each of the respective dielectric constants for each of the layers in the medium are determined, as will become more evident.

Figure 3:
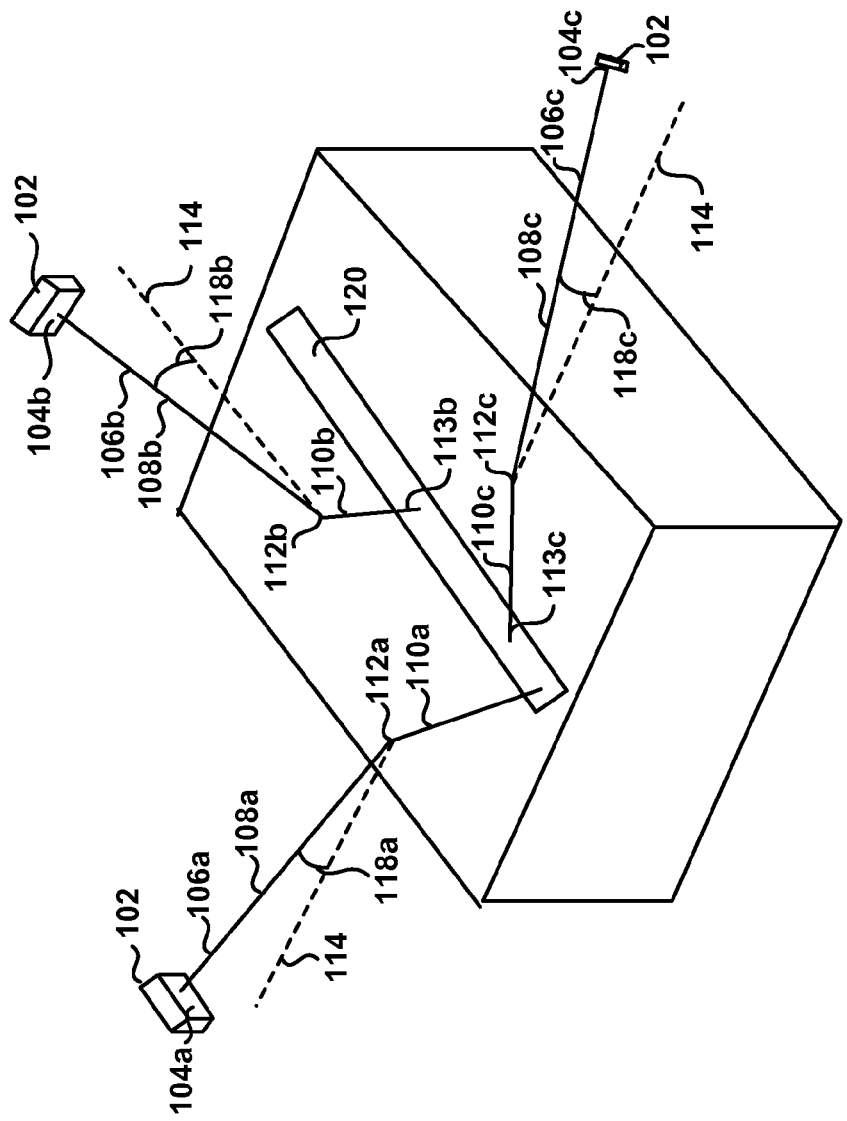
FIG. 3 depicts a perspective view of a technique for taking three views of an underground object, according to one embodiment.

According to one embodiment, a third or fourth view can be obtained of the object 120 as a part of improving accuracy or improving resolution. FIG. 3 depicts a perspective view of a technique for taking three views of an underground object 120, according to one embodiment. For example, a third view can be taken from a third geolocation 104c as depicted in FIG. 3 using various embodiments as discussed herein.

More specifically, the radar head 102 can be moved to the third geolocation 104c where similar processing can be performed to obtain a third view. A third radar signal 106c can be transmitted from the transmitting radar antennae 210a from the third geolocation 104c. The third radar signal 106c can travel through the air along a trajectory as indicated by the third air path 108c. According to one embodiment, the trajectory of the air path 108a for the first radar signal 106a and the trajectory of the air path 108c for the third radar signal 106c form an angle that is approximately 180 degrees. The third radar signal 106c can enter the ground's surface 114 at location 112c where it can intercept the surface 114 of the ground.

The third radar signal 106c can travel along the earth path 110c and intercept the object 120 at location 113c, which causes the third radar signal 106c to be reflected back. The receiving radar antennae 210b can receive the reflected radar signal 106c for the third view at the third geolocation 104c.

Figure 4:
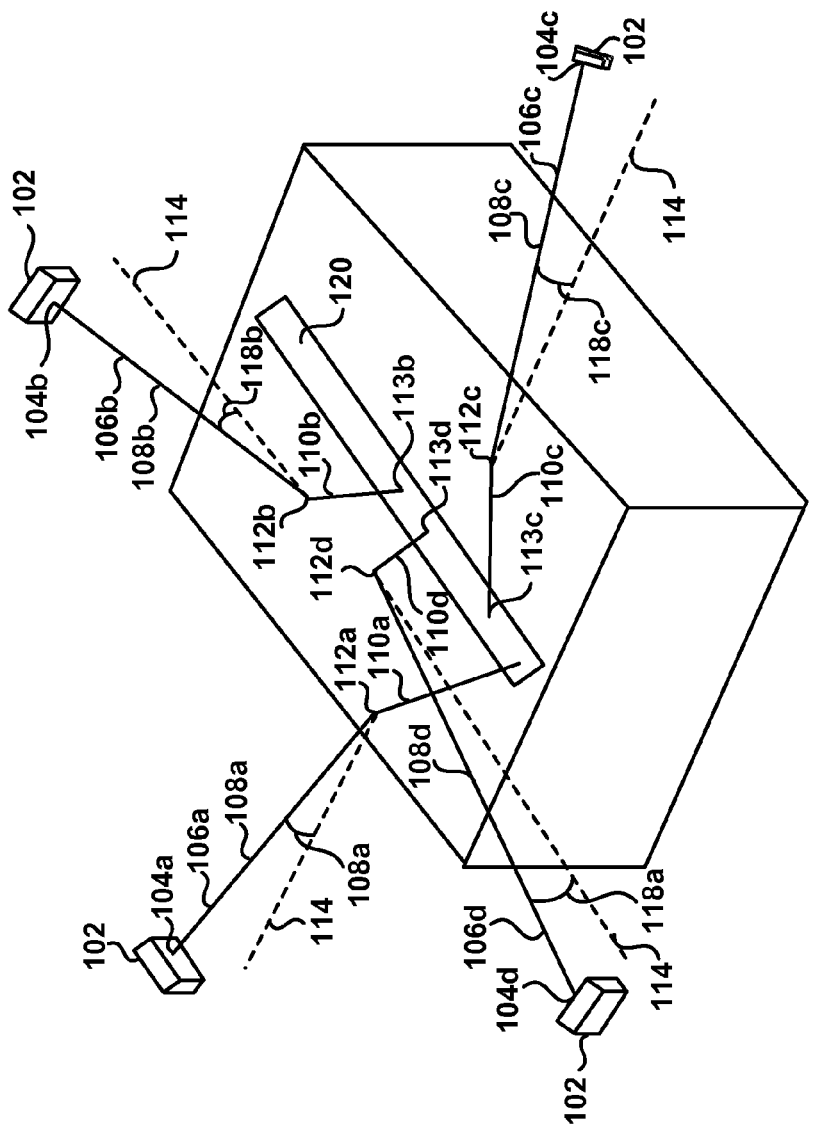
FIG. 4 depicts a perspective view of a technique for taking four views of an underground object, according to one embodiment.

FIG. 4 depicts a perspective view of a technique for taking four views of an underground object 120, according to one embodiment. For example, a fourth view can be taken from a fourth geolocation 104d as depicted in FIG. 4 using various embodiments as discussed herein.

More specifically, the radar head 102 can be moved to the fourth geolocation 104d where similar processing can be performed to obtain a fourth view. A fourth radar signal 106d can be transmitted from the transmitting radar antennae 210a from the fourth geolocation 104d. The fourth radar signal 106d can travel through the air along a trajectory as indicated by the fourth air path 108d. According to one embodiment, the trajectory of the air path 108a for the first radar signal 106a and the trajectory of the air path 108d for the fourth radar signal 106d form an angle that is approximately 270 degrees. The fourth radar signal 106d can enter the ground at location 112d where it intercepts the surface 114 of the ground.

The fourth radar signal 106d can travel along the earth path 110d and can intercept the object 120 at location 113d, which causes the fourth radar signal 106d to be reflected back. The receiving radar antennae 210b can receive the reflected radar signal 106d for the fourth view at the fourth geolocation 104d.

According to various embodiments, chirp or linear FM modulation that is a function of the wave lengths is used for one or more of the radar signals.

According to one embodiment, information describing each of the views is obtained. For example, the information describing a view can include the angle 118 between the transmitted radar signal 106 and the ground's surface 114, the length of the air path 108 for that radar signal 106, and the amount of time from transmission to reception of a radar signal 106, among other things.

As will become more evident, the information describing each of the views can be correlated with each other to estimate one or more dielectric constants. The one or more dielectric constants can be used to estimate one or more velocities of the radar signals 106 through one or more layers of material between the ground's surface 114 and the object 120, which in turn can be used to better estimate the location of the object 120 in the ground.

According to one embodiment, any two or more of the views of the object 120 can be used to obtain a three dimensional (3D) picture of the object 120.

An Object

Referring to FIGS. 1, 3 and 4, according to one embodiment, the object 120, according to various embodiments, is made of a material that has a different dielectric constant than the medium that is between it and the ground's surface 114. The difference between the respective dielectric constants, according to one embodiment, is used for locating the object 120.

According to another embodiment, the object 120 has a dielectric constant that is close to the medium's dielectric constant. For example, a pipe made of PVC typically has a dielectric constant that is close to that of the earth. However, embodiments are well suited for locating an object 120, such as a PVC pipe, provided it contains another material, such as water, air or oil, which has a different dielectric constant than earth.

It may be known that an object 120 is somewhere within the subsurface volume 122 prior to the first view, second view, third view or fourth view. However, it may not have been known that an object 120 was anywhere within the subsurface volume 122 prior to obtaining any of the views.

In some embodiments may have been known that an object 120 was in the subsurface volume 122 prior to the fourth view but not known prior to the third view. Likewise, it may have been known that the object 120 was in the subsurface volume 122 prior to the third view but not known prior to the second view and so on.

In other embodiments, the existence of object 120 in subsurface volume 122 may be known after, for example the second view, however the third view, fourth view, etc. allow for better dielectric constant estimation, leading to better accuracy with respect to the geolocation of object 120 by allowing a previous estimation of the dielectric constant to be refined through the correlation of information from additional views.

Further, it may be known that a first object is within the subsurface volume 122 and while the first object is being processed, according to various embodiments, a second object, which was not previously known, may be discovered. For example, it may be known that the first object was within the subsurface volume 122 prior to any one of the views and a second previously unknown object may be discovered during any one of the views.

Angle Between Radar Signal and Ground's Surface

Referring to FIGS. 1, 3, and 4, according to one embodiment, the angle 118 between each of the radar signals 106 and the ground's surface 114 is an oblique angle. An oblique angle, according to one embodiment, is an angle that is not perpendicular to the ground's surface 114.

According to one embodiment, an angle 118 between a radar signal 106 and the ground surface 114 is approximately a Brewster angle in order to maximize the power of the radar signal 106 entering the ground. For example, the Brewster angle is an angle at which one of the polarizations cancels itself out resulting in close to all of a radar signal 106 being refracted into the ground.

Angle Between Radar Signals

Figure 5:
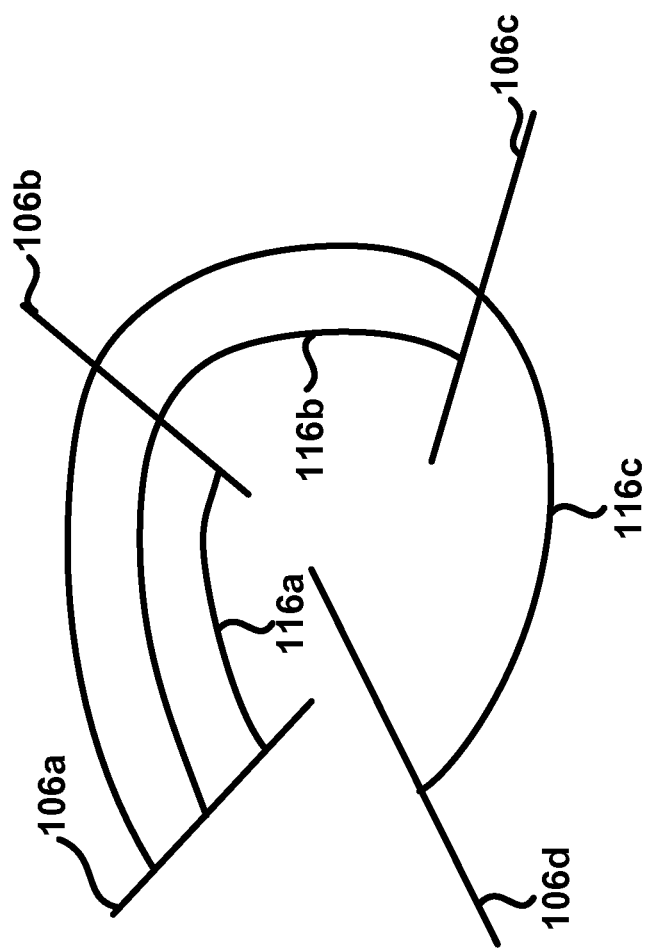
FIG. 5 depicts radar signals and angles between air paths associated with the radar signals according to one embodiment.

FIG. 5 depicts radar signals and angles between air paths associated with the radar signals according to one embodiment. For example, FIG. 5 depicts the first, second, third and fourth radar signals 106, according to one embodiment, and a first angle 116a between the first and second air paths 108a, 108b, a second angle 116b between the first and third air paths 108a, 108c, and a third angle 116c between the first and fourth air paths 108a, 108d. According to one embodiment, the first angle 116a is approximately 90 degrees, the second angle 116b is approximately 180 degrees, and the third angle 116c is approximately 270 degrees.

Although various embodiments are described with respect to angles 116 between respective trajectories as indicated by the air paths 108 that are approximately 90 degrees, 180 degrees, 270 degrees, various embodiments are well suited to other angles. For example, according to one embodiment, the first angle 116a may range between 20 degrees and 160 degrees or between 200 and 340 degrees. According to another embodiment, the first angle 116a may range from 20 degrees to 135 degrees, the second angle 116b may range from 135 degrees to 225 degrees, and the third angle 116c may range from 225 degrees to 340 degrees.

Planes

Referring to FIGS. 1, 3, 4 and 5, according to one embodiment, the geolocations 104 are located in a plane that is approximately horizontal. The angles 116a-116c (FIG. 5) may be formed by moving clockwise or counter clockwise in the plane that is approximately horizontal, according to one embodiment. However, embodiments are well suited for planes at other orientations. For example, the plane may be perpendicular to the ground's surface 114 or at a 45 degree angle of the ground's surface 114, among other things. Embodiments are well suited for planes that are at any angle with respect to the ground's surface 114. Further, embodiments are well suited for using more than one plane. For example, the first geolocation 104a and the second geolocation 104b may be in a first plane while the third and fourth geolocations 104c, 104d may be located in a second plane. Embodiments are well suited to other combinations of planes with respect to geolocations 104.

Contour of the Ground's Surface

Referring to FIGS. 1, 3 and 4, according to one embodiment, the contour of the ground's surface 114 is used as a part of determining where a radar signal 106 intersects 112 with the ground's surface 114, which in turn can be used for determining the length of the air path 108 for a radar signal 106. A topographical survey of the ground's surface 114 can be used for determining the contour of the surface 114. According to another embodiment, a topographical survey is not used and is not required. For example, the contour of the surface 114 of the ground may be reasonably flat or may be reasonably well known. A road surface is an example of a ground surface 114 that may be flat or reasonably well known.

Dielectric Constant

According to one embodiment, the informations for the different views of an object 120 taken from different geolocations 104 are correlated with each other to estimate one or more dielectric constants of the medium between the ground's surface 114 and an object 120. According to one embodiment, an estimation filter is used as a part of approximating the dielectric constant of the medium. Some non-limiting examples of estimation filters include a Kalman filter and a least squares filter. Multiple variables may be fitted using the least squares filter. Examples of various variables include the dielectric constant, the contour of the surface 114 of the ground, among others. An a priori dielectric constant for the ground is used as a starting point.

In another embodiment, a synthetic aperture realization may be employed, wherein the synthetic aperture algorithm is augmented so that the different radar views run simultaneously. In this embodiment, the dielectric constant is adjusted to maximize the agreement of the views and the focus of the synthetic apertures on the object.

Further, the medium may not be homogenous. For example, the medium may have layers of different types of materials. More specifically, the medium may have respective layers of asphalt, followed by gravel, then dirt. The medium may have a layer of clay. These are just a few examples of the different types of materials that may be found in the medium that make it heterogeneous. Each type of material or layer may have a different dielectric constant. Therefore, another variable that may be fitted may be the dielectric constant. The dielectric constants of the respective materials or layers can be used to determine the velocity of a radar signal when it traveled through that material or layer. For example, if infrastructure below a road surface is being explored, the road surface will have a reasonably well-known thickness, which can be verified with the radar, and dielectric constant.

Image of an Object

According to one embodiment, one or more characteristics of the object 120 can be used as a part of locating the object 120. After processing the radar data, the estimate of object surface will consist of a collection of positionally identified points underground—a "point cloud." The position estimate can be improved if the further adjustment of dielectric constant and other parameters, such as dielectric layer thickness, that were used to create the point cloud is done to improve conformance between the point cloud and the known shape of the object. In a specific example, if it is known that the object 120 is a pipe, then a feedback component can be implemented to adjust the dielectric constant and other parameters so that the image of a pipe best matching to the resulting point cloud. The resulting point cloud, following the adjustment(s) will have better accuracy.

Large Aperture and Synthetic Aperture Radar

According to one embodiment, a large aperture is used as a part of determining a view of an object 120 from a geolocation 104. According to one embodiment, a large aperture can be synthesized. Various techniques can be used for synthesizing a large aperture. One technique involves using a single radar head and moving that single radar head around. Another technique involves using a multiple antennae array.

Figure 6:
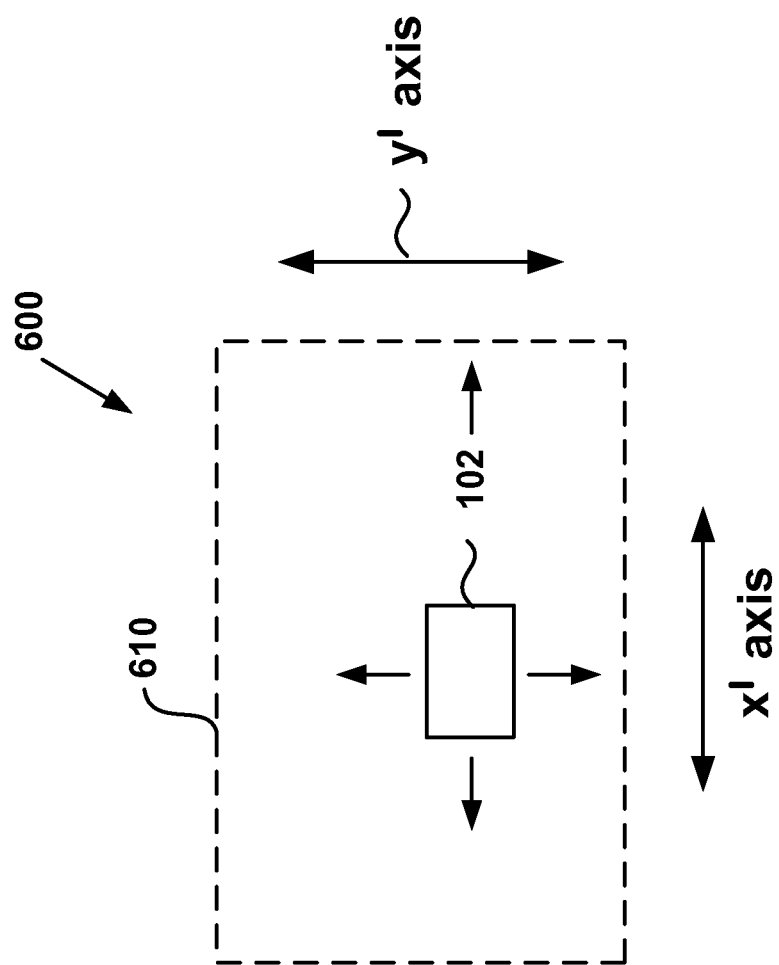
FIGS. 6 and 7 depict two different types of devices that can be used for synthesizing a large aperture, according to various embodiments.
Figure 7:
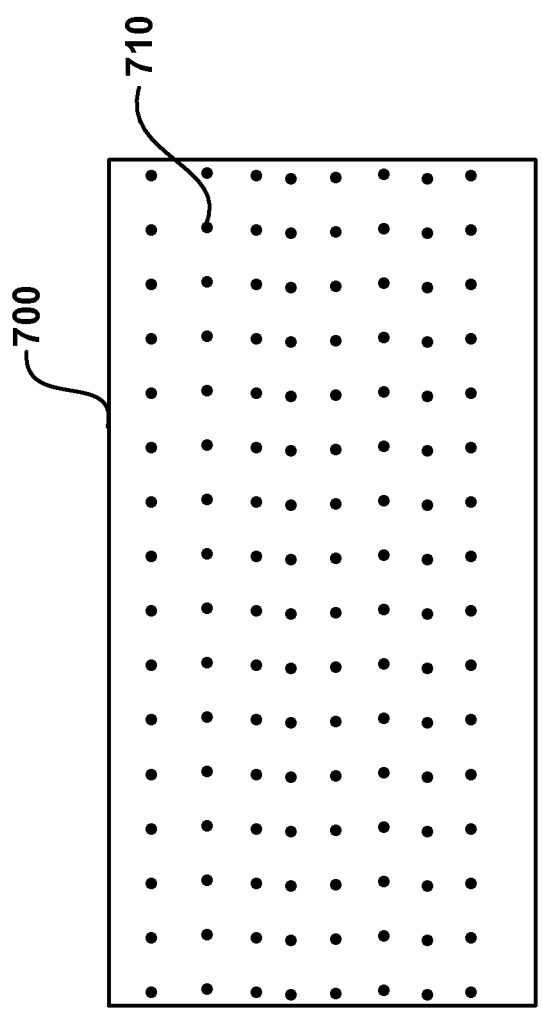

FIGS. 6 and 7 depict two different types of devices that can be used for synthesizing a large aperture, according to various embodiments. Device 600 includes a single radar head 102 that can be moved to any position in a matrix defined by a rectangle 610 as indicated by the x'-axis and the y'-axis. For example, the single radar head 102 could be moved side ways on a boom in the x'-axis. Further, the radar head 102 may be moved up and down, for example, by moving the boom up and down in the y'-axis. Radar signals can be transmitted from and then received at any of the positions in the matrix defined by the rectangle 610.

Device 700 includes multiple antennas 710 that are located at various positions in a matrix defined by a rectangle as indicated by the x"-axis and the y"-axis. A first subset of the antennas 710 are transmitting antennas and a second subset of the antennas 710 are receiving antennas. Radar signals can be transmitted from any of the transmitting antennas and then received at any of the receiving antennas associated with device 700.

Either device 600 or 700 could be positioned at any of the geolocations 104 depicted in FIG. 1, 3 or 4 to determine a view from any of the respective geolocations 104.

An Example of a System

Figure 8:
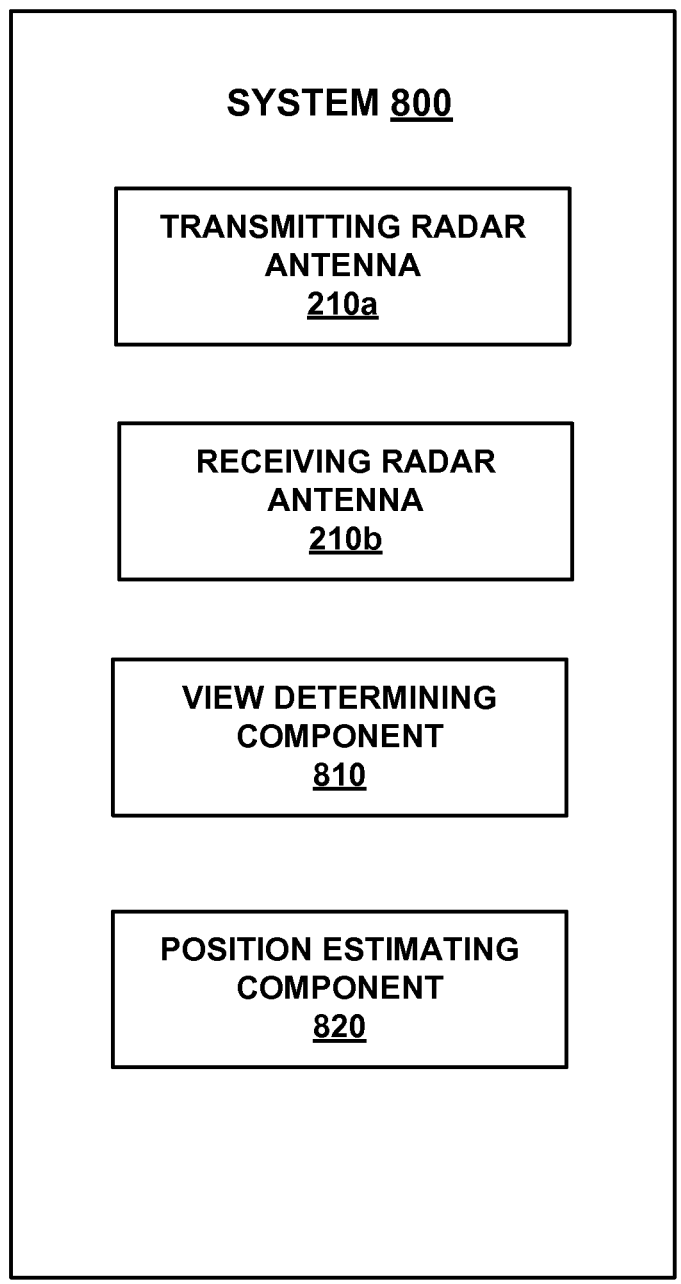
FIG. 8 depicts a block diagram of a system for detecting an object that is under the ground, according to one embodiment.

FIG. 8 depicts a block diagram of a system 800 for detecting an object that is under the ground, according to one embodiment. The blocks that represent features in FIG. 8 can be arranged differently than as illustrated, and can implement additional or fewer features than what are described herein. Further, the features represented by the blocks in FIG. 8 can be combined in various ways. The system 800 can be implemented using hardware, hardware and software, hardware and firmware, or a combination thereof.

The system 800, as depicted in FIG. 8, includes a transmitting radar antennae 210a and a receiving radar antennae 210b. The system 800 also includes a view-determining-component 810 and a position-estimating-component 820. The view-determining-component 810 is configured for determining a first view of the object 120, which is at least partially under the surface 114 of the ground, by transmitting a first radar signal 106a from a first known geolocation 104a and for determining a second view of the object 120 by transmitting a second radar signal 106b from a second known geolocation 104b, wherein respective trajectories 108a, 108b of the first and second radar signals 106a, 106b are oblique with respect to the surface 114 of the ground and the respective trajectories 108a, 108b are at an angle 116a with respect to each other. The position-estimating-component 820 is configured for approximating a dielectric constant associated with medium between the object 120 and the surface 114 of the ground by correlating information pertaining to the first view and the second view. According to one embodiment, a dielectric constant that is associated with the medium could be a dielectric constant for a homogenous medium a collection of dielectric constants for the layers of material for a heterogeneous medium. In some embodiments, position-estimating-component 820 further utilizes one or more object models to enhance position estimates. For example, when the nature of an underground object is known in advance, a model of that object can be used to better fit the data obtained from the reflected radar signals. Consider an example where it is known from some source such as a blueprint or a geographic information system that the actual underground object being searched for is a sewer pipe. In such a situation, because it is known in advance that the collected data points should conform to the shape of a cylindrical sewer pipe, position-estimating-component 820 utilizes a model of a cylindrical shape when correlating information pertaining to the first and second view (and any additional views) of the actual object. In a similar fashion, models of other known objects may also be employed.

The components 210a, 210b, 810, 820 may be located in the same electronic device or any number of different electronic devices.

An Example of a Method

Figure 9:
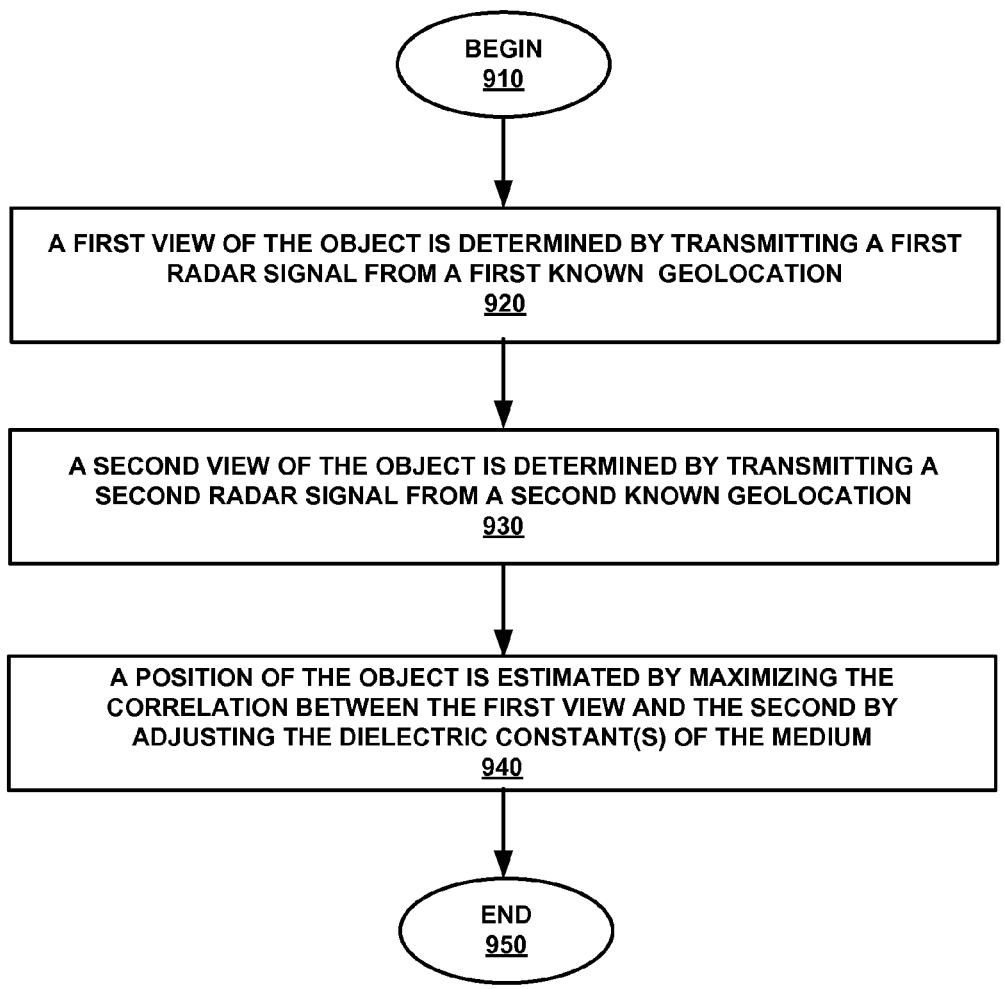
FIG. 9 is a flow chart of a method of detecting an underground object, according to one embodiment.

FIG. 9 is a flow chart 900 of a method of detecting an underground object, according to one embodiment. Although specific operations are disclosed in flowchart 900, such operations are exemplary. That is, embodiments of the present invention are well suited to performing various other operations or variations of the operations recited in flowchart 900. It is appreciated that the operations in flowchart 900 may be performed in an order different than presented, and that not all of the operations in flowchart 900 may be performed.

For the sake of illustration, refer to FIGS. 1, 2 and 5 for the following description of flowchart 900.

At 910, the method begins.

At 920, a first view of the object 120, which is at least partially under the ground's surface 114, is determined by transmitting a first radar signal 106a from a first known geolocation 104a. For example, a first radar signal 106a is transmitted by a transmitting radar antennae 210a from a first geolocation 104a. The time that a radar signal 106 is transmitted is referred to as "time of transmission." According to one embodiment, the angle 118a between the first radar signal 106a and the ground surface 114 is approximately a Brewster angle in order to maximize the power of the first radar signal 106a entering the ground.

The first radar signal 106a travels along an air path 108a until it intercepts the surface 114 of the ground at location 112a. Information pertaining to the contour of the ground can be used as a part of estimating the location 112a of interception, as discussed herein. The earth path 110a of the first radar signal 106a is from location 112a to the object 120 at location 113a. Since the first radar signal 106a transitions from traveling through the air to traveling through the ground, the first radar signal 106a is reflected and the angle of transmission for the earth path 110a is different than the angle of transmission for the air path 108a.

The first radar signal 106a bounces off of the object 120 and is intercepted by a receiving radar antennae 210b. The time that a radar signal 106a is received by the receiving radar antennae 210b is referred to as "time of reception."

At 930, a second view of the object 120 is determined by transmitting a second radar signal 106b from a second known geolocation 104b.

For example, a second radar signal 106b is transmitted by the transmitting radar antennae 210a from a second geolocation 104b. According to one embodiment, the angle 118b between the second radar signal 106b and the ground surface 114 is approximately a Brewster angle in order to maximize the power of the second radar signal 106b entering the ground.

The second radar signal 106b travels along an air path 108b until it intercepts the surface 114 of the ground at location 112b. Information pertaining to the contour of the ground's surface 114 can be used as a part of estimating the location 112b of interception, as discussed herein. The earth path 110b of the second radar signal 106b is from location 112b to the object 120 at location 113b. Since the second radar signal 106b transitions from traveling through the air to traveling through the ground, the second radar signal 106b is reflected and the angle of transmission for the earth path 110b is different than the angle of transmission for the air path 108b.

The second radar signal 106b bounces off of the object 120 and is intercepted by the receiving radar antennae 210b.

The respective trajectories of the air paths 108a, 108b of the first and second radar signals 106a, 106b are, according to one embodiment, oblique with respect to the surface 114 of the ground. For example, the trajectories of the air paths 108a, 108b of the first and second radar signals 106a, 106b are not perpendicular with respect to the surface 114 of the ground.

Referring to FIG. 5, the respective trajectories of the air paths 108a, 108b are at an angle 116a with respect to each other. For example, the angle 116a between the trajectories of the respective air paths 108a, 108b is approximately 90 degrees, according to one embodiment.

At 940, referring to FIGS. 1 and 2, a position of the object is estimated from the dielectric constant of medium between the object 120 and the surface 114 of the ground. This position of the object is estimated by maximizing the correlation of information pertaining to the first view and the second view by adjusting an estimated dielectric constant(s) of the medium. According to one embodiment, the medium is between the surface 114 of the ground at locations 112a and 112b and respective locations 113a and 113b of the object 120 along the respective earth paths 110a, 110b. According to one embodiment, a dielectric constant that is associated with the medium could be a dielectric constant for a homogenous medium or a collection of dielectric constants for the layers of material for a heterogeneous medium.

According to one embodiment, information describing each of the views is obtained. For example, the information describing a view includes, among other things, the angle 118 that a radar signal 106 was transmitted with respect to the surface 114 of the ground, the length of the air path 108 for that radar signal 106, and the amount of time from transmission until reception of the transmitted radar signal 106.

The contour of the ground, as discussed herein, can be used as a part of estimating where a radar signal 106 intercepted 112 the ground's surface 114, and therefore, can be used in estimating the length of an air path 108. According to one embodiment, a topographical survey of the ground's surface 114 is used as a part of determining the contour of the surface 114. According to another embodiment, a topographical survey is not used and is not required. For example, the contour of the surface 114 of the ground may be reasonably flat or reasonably well known.

The information describing each of the views can be used to estimate one or more dielectric constants associated with the medium between the ground's surface 114 and the object 120. According to one embodiment, an estimation filter is used as a part of approximating the dielectric constant of the medium. Some non-limiting examples of estimation filters include a Kalman filter and a least squares filter. Multiple variables may be fitted using the least squares fitted filter. Examples of various variables include the dielectric constant, the contour of the surface 114 of the ground, among others. Further, the medium may not be homogenous. For example, the medium may have layers of different types of materials. More specifically, the medium may have respective layers of asphalt, followed by gravel, then dirt. The medium may have a layer of clay. These are just a few examples of the different types of materials that may be found in the medium that make it heterogeneous. Each type of material may have a different dielectric constant. Therefore, another variable that may be fitted using an estimation algorithm such as a least squares method may be the dielectric constants for the materials or layers of a heterogeneous medium.

A dielectric constant of a material or a layer can be used as a part of estimating the velocity of a radar signal 106 through that material or layer. The velocity of a radar signal 106 through a material or layer in combination with the angle 118 of the transmitted radar signal with respect to the ground's surface 114 can be used to estimate how far the radar signal 106 traveled in a material or layer. In the case of a heterogeneous medium, the lengths that the radar signals 106a, 106b traveled in the respective materials or layers can be used as a part of estimating the location of the object 120 in the ground. According to one embodiment, the location includes the depth of the object 120 below the ground's surface 114.

According to one embodiment, the position-estimating-component 820, depicted in FIG. 8, performs the processing described with respect to 940.

At 950, the method ends.

According to various other embodiments, additional views of the object 120 may be determined. For example, referring to FIG. 3, a third view may be taken from a third geolocation 104c where the angle 116b between the respective trajectories of the air paths 108a, 108c for the first radar signal 106a and the third radar signal 106c is approximately 180 degrees. Referring to FIG. 4, a fourth view may be taken from a fourth geolocation 104d where the angle 116c between the respective trajectories of the air paths 108a, 108d for the first radar signal 106a and the fourth radar signal 106d is approximately 270 degrees. These are just a few examples of additional views and respective angles 116b, 116c that may be used.

Additional views as depicted in FIGS. 3 and 4, or a combination thereof, can be processed in a similar manner as the first view and the second view described in the context of FIG. 1 and flowchart 900 of FIG. 9.

Computer Readable Storage Medium

Any one or more of the embodiments described herein can be implemented using radar transmitting and receiving hardware, along with non-transitory computer readable storage medium and computer-executable instructions which reside, for example, in computer-readable storage medium of a computer system or like device. The non-transitory computer readable storage medium can be any kind of memory that instructions can be stored on. Examples of the non-transitory computer readable storage medium include but are not limited to a disk, a compact disk (CD), a digital versatile device (DVD), read only memory (ROM), flash, and so on. As described above, certain processes and operations of various embodiments of the present invention are realized, in one embodiment, as a series of instructions (e.g., software program) that reside within non-transitory computer readable storage memory of a computer system and are executed by the computer processor of the computer system. When executed, the instructions cause the computer system to implement the functionality of various embodiments of the present invention. According to one embodiment, the non-transitory computer readable storage medium is tangible.

CONCLUSION

Although various embodiments were described in the context of moving a radar head or a device from one geolocation to another geolocation, embodiments are well suited to using different radar heads or devices at each of the geolocations so that the radar heads or devices are not moved. Various embodiments are well suited for taking the different views simultaneously or at approximately the same time.

Various embodiments do not use or do not require any portion of the object to be exposed above the ground's surface. However, various embodiments are well suited for a portion of the object to be exposed above the ground's surface.

Various embodiments do not use or do not require a radar signal to be transmitted perpendicularly to the ground's surface. Various embodiments do not use or do not require a radar signal to be transmitted close to the ground's surface.

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations and illustrations. However, any two or more embodiments or features may be combined. Further, any embodiment or feature may be used separately from any other embodiment or feature. Phrases, such as "an embodiment," "one embodiment," among others, used herein, are not necessarily referring to the same embodiment. Features, structures, or characteristics of any embodiment may be combined in any suitable manner with one or more other features, structures, or characteristics.

What is claimed is:

1. A method of detecting an underground object, the method comprising:
   determining a first view of the object, which is at least partially under a surface of ground, by transmitting a first radar signal from a first known geolocation, wherein a medium between the surface of the ground and the object comprises multiple layers of different types of material;
   determining a second view of the object by transmitting a second radar signal from a second known geolocation, wherein respective first and second trajectories of the first and second radar signals are oblique with respect to the surface of the ground and the respective first and second trajectories are at a first angle with respect to each other;
   determining a velocity that at least one of the radar signals traveled through each of the layers;
   determining estimated dielectric constants for each of the layers based on the respective velocities for each of the layers; and
   estimating a position of the object by maximizing a correlation between the first view and the second view by adjusting an estimated dielectric constant associated with medium between the object and the surface of the ground, wherein the determining of the first view, the determining of the second view and the estimating are performed by one or more computer processors.

2. The method as recited by claim 1, wherein the determining of the second view further comprises:
   determining the second view of the object by transmitting the second radar signal from the second known geolocation, wherein the first angle between the first trajectory and the second trajectory is approximately 90 degrees.

3. The method as recited by claim 1, wherein the method further comprises:
   determining a third view of the object by transmitting a third radar signal from a third known geolocation, wherein a third trajectory of the third radar signal is oblique with respect to the surface of the ground and the first trajectory and the third trajectory are at a second angle with respect to each other; and
   refining the estimated dielectric constant associated with the medium between the object and the surface of the ground by correlating information pertaining to the first view, the second view, and the third view.

4. The method as recited by claim 3, wherein the determining of the third view further comprises:
   determining the third view of the object by transmitting the third radar signal from the third known geolocation, wherein the second angle between the first trajectory and the third trajectory is approximately 180 degrees.

5. The method as recited by claim 3, wherein the method further comprises:
   determining a fourth view of the object by transmitting a fourth radar signal from a fourth known geolocation, wherein a fourth trajectory of the fourth radar signal is oblique with respect to the surface of the ground and the first trajectory and the fourth trajectory are at a third angle with respect to each other; and
   refining the estimated dielectric constant associated with the medium between the object and the surface of the ground by correlating information pertaining to the first view, the second view, the third view, and the fourth view.

6. The method as recited by claim 5, wherein the determining of the fourth view further comprises:
   determining the fourth view of the object by transmitting the fourth radar signal from the fourth known geolocation, wherein the third angle between the first trajectory and the fourth trajectory is approximately 270 degrees.

7. The method as recited by claim 1, wherein the method further comprises:
   transmitting the first radar signal and the second radar signal at an angle with respect to the surface of the ground that approximates a Brewster angle.

8. The method as recited by claim 1, wherein the method further comprises:
   determining a first interception of the first radar signal with the ground based on information describing a contour of the surface of the ground; and
   determining a second interception of the second radar signal with the ground based on information describing the contour of the surface of the ground.

9. The method as recited by claim 8, wherein the method further comprises:
   determining a first length of a first air path based on the first angle and the first interception; and
   determining a second length of a second air path based on the first angle and the second interception.

10. The method as recited by claim 9, wherein the method further comprises:
    determining a first velocity of the first radar signal through a first earth path based on the first length and the first angle;
    determining a second velocity of the second radar signal through a second earth path based on the second length and the first angle; and
    determining the estimated dielectric constant based on the first velocity and the second velocity.

11. A system for detecting an object that is underground, the system comprising:
    a transmitting radar antennae and a receiving radar antennae;
    a view-determining-component configured for:

determining a first view of the object, which is at least partially under a surface of ground, by transmitting a first radar signal from a first known geolocation;

determining a second view of the object by transmitting a second radar signal from a second known geolocation, wherein respective trajectories of the first and second radar signals are oblique with respect to the surface of the ground and the respective trajectories are at a first angle with respect to each other; and a position-estimating-component configured for:

determining a first velocity of the first radar signal through a first earth path based on a first length and the first angle;

determining a second velocity of the second radar signal through a second earth path based on a second length and the first angle;

determining an estimated dielectric constant based on the first velocity and the second velocity; and estimating a position of the object by maximizing a correlation between the first view and the second view by adjusting an estimated dielectric constant associated with medium between the object and the surface of the ground.

12. The system of claim 11, wherein the system further comprises:

one or more synthetic aperture radar (SAR) devices configured for transmitting the first radar signal and transmitting the second radar signal.

13. The system of claim 11, wherein the position-estimating-component:

employs a model of a shape of the object.

14. The system of claim 11, wherein the first radar signal and the second radar signal are transmitted at an angle with respect to the surface of the ground that approximates a Brewster angle.

15. The system of claim 11, wherein the trajectories are a first trajectory of the first radar signal and a second trajectory of the second radar signal and wherein:

the view-determining-component is further configured for determining a third view of the object by transmitting a third radar signal from a third known geolocation, wherein a third trajectory of the third radar signal is oblique with respect to the surface of the ground and the first trajectory and the third trajectory are at a second angle with respect to each other; and the position-estimating-component is further configured for refining the estimated dielectric constant associated with the medium between the object and the surface of the ground by correlating information pertaining to the first view, the second view, and the third view.

16. The system of claim 15, wherein:

the view-determining-component is further configured for determining a fourth view of the object by transmitting a fourth radar signal from a fourth known geolocation, wherein a fourth trajectory of the fourth radar signal is oblique with respect to the surface of the ground and the first trajectory and the fourth trajectory are at a third angle with respect to each other; and the position-estimating-component is further configured for refining the estimated dielectric constant associated with the medium between the object and the surface of the ground by correlating information pertaining to the first view, the second view, the third view, and the fourth view.

17. The system of claim 11, wherein:

the view-determining-component is further configured for determining a first interception of the first radar signal with the ground based on information describing a contour of the surface of the ground; and the view-determining-component is further configured for determining a second interception of the second radar signal with the ground based on information describing the contour of the surface of the ground.

18. The system of claim 17, wherein:

the view-determining-component is further configured for determining a first length of a first air path based on the first angle and the first interception; and the view-determining-component is further configured for determining a second length of a second air path based on the first angle and the second interception.

19. The system of claim 11, wherein a medium between the surface of the ground and the object comprises multiple layers of different types of material and wherein the position-estimating-component is further configured for:

determining a velocity that at least one of the radar signals traveled through each of the layers; and determining estimated dielectric constants for each of the layers based on the respective velocities for each of the layers.

20. A non-transitory computer readable storage medium having computer-executable instructions stored thereon for causing a computer system to perform a method of detecting an underground object, the method comprising:

determining a first view of the object, which is at least partially under a surface of ground, based on transmission of a first radar signal from a first known geolocation, wherein a medium between the surface of the ground and the object comprises multiple layers of different types of material;

determining a second view of the object based on transmission of a second radar signal from a second known geolocation, wherein respective first and second trajectories of the first and second radar signals are oblique with respect to the surface of the ground and the respective first and second trajectories are at a first angle with respect to each other;

determining a velocity that at least one of the radar signals traveled through each of the layers;

determining the estimated dielectric constants for each of the layers based on the respective velocities for each of the layers; and estimating a position of the object by maximizing a correlation between the first view and the second view by adjusting an estimated dielectric constant associated with medium between the object and the surface of the ground.

21. The non-transitory computer readable storage medium of claim 20, wherein the determining of the second view further comprises:

determining the second view of the object based on transmission of the second radar signal from the second known geolocation, wherein the first angle between the first trajectory and the second trajectory is approximately 90 degrees.

22. The non-transitory computer readable storage medium of claim 20, wherein the method further comprises:

determining a third view of the object based on transmission of a third radar signal from a third known geolocation, wherein a third trajectory of the third radar signal is oblique with respect to the surface of the ground and the first trajectory and the third trajectory are at a second angle with respect to each other; and refining the estimated dielectric constant associated with the medium between the object and the surface of the ground by correlating information pertaining to the first view, the second view, and the third view.

23. The non-transitory computer readable storage medium of claim 22, wherein the determining of the third view further comprises:

determining the third view of the object based on transmission of the third radar signal from the third known geolocation, wherein the second angle between the first trajectory and the third trajectory is approximately 180 degrees.

24. The non-transitory computer readable storage medium of claim 23, wherein the method further comprises:

determining a fourth view of the object based on transmission of a fourth radar signal from a fourth known geolocation, wherein a fourth trajectory of the fourth radar signal is oblique with respect to the surface of the ground and the first trajectory and the fourth trajectory are at a third angle with respect to each other; and refining the estimated dielectric constant associated with the medium between the object and the surface of the ground by correlating information pertaining to the first view, the second view, the third view, and the fourth view.

25. The non-transitory computer readable storage medium of claim 24, wherein the determining of the fourth view further comprises:

determining the fourth view of the object based on transmission of the fourth radar signal from the fourth known geolocation, wherein the third angle between the first trajectory and the fourth trajectory is approximately 270 degrees.

26. The non-transitory computer readable storage medium of claim 20, wherein the method further comprises:

determining a first interception of the first radar signal with the ground based on information describing a contour of the surface of the ground; and determining a second interception of the second radar signal with the ground based on information describing the contour of the surface of the ground.

27. The non-transitory computer readable storage medium of claim 26, wherein the method further comprises:

determining a first length of a first air path based on the first angle and the first interception; and determining a second length of a second air path based on the first angle and the second interception.

28. The non-transitory computer readable storage medium of claim 27, wherein the method further comprises:

determining a first velocity of the first radar signal through a first earth path based on the first length and the first angle;

determining a second velocity of the second radar signal through a second earth path based on the second length and the first angle; and determining the estimated dielectric constant based on the first velocity and the second velocity.

* * * * *

UNITED STATES PATENT AND TRADEMARK OFFICE
CERTIFICATE OF CORRECTION

PATENT NO.         : 9,157,993 B2
APPLICATION NO.    : 13/483390
DATED              : October 13, 2015
INVENTOR(S)        : Bruce Peetz Page 1 of 1

It is certified that error appears in the above-identified patent and that said Letters Patent is hereby corrected as shown below:

In the Claims

Column 15, Claim 11, Line 12, Delete: "a"

Insert -- the --

Column 15, Claim 11, Line 15, Delete: "a"

Insert -- the --

Column 15, Claim 11, Line 16, Delete: "an"

Insert -- the --

Column 15, Claim 11, Line 21, Delete: "an"

Insert -- the --

Signed and Sealed this
Twenty-eighth Day of June, 2016

Michelle K. Lee
*Director of the United States Patent and Trademark Office*